Feb. 12, 1952 — R. F. FARRIS — 2,585,378
CEMENTING OF WELLS
Filed March 1, 1946 — 2 SHEETS—SHEET 1

▼ Typical Well Cement in
■ Second Fissure Develops

Riley F. Farris, INVENTOR.
BY Goodwin
ATTORNEY

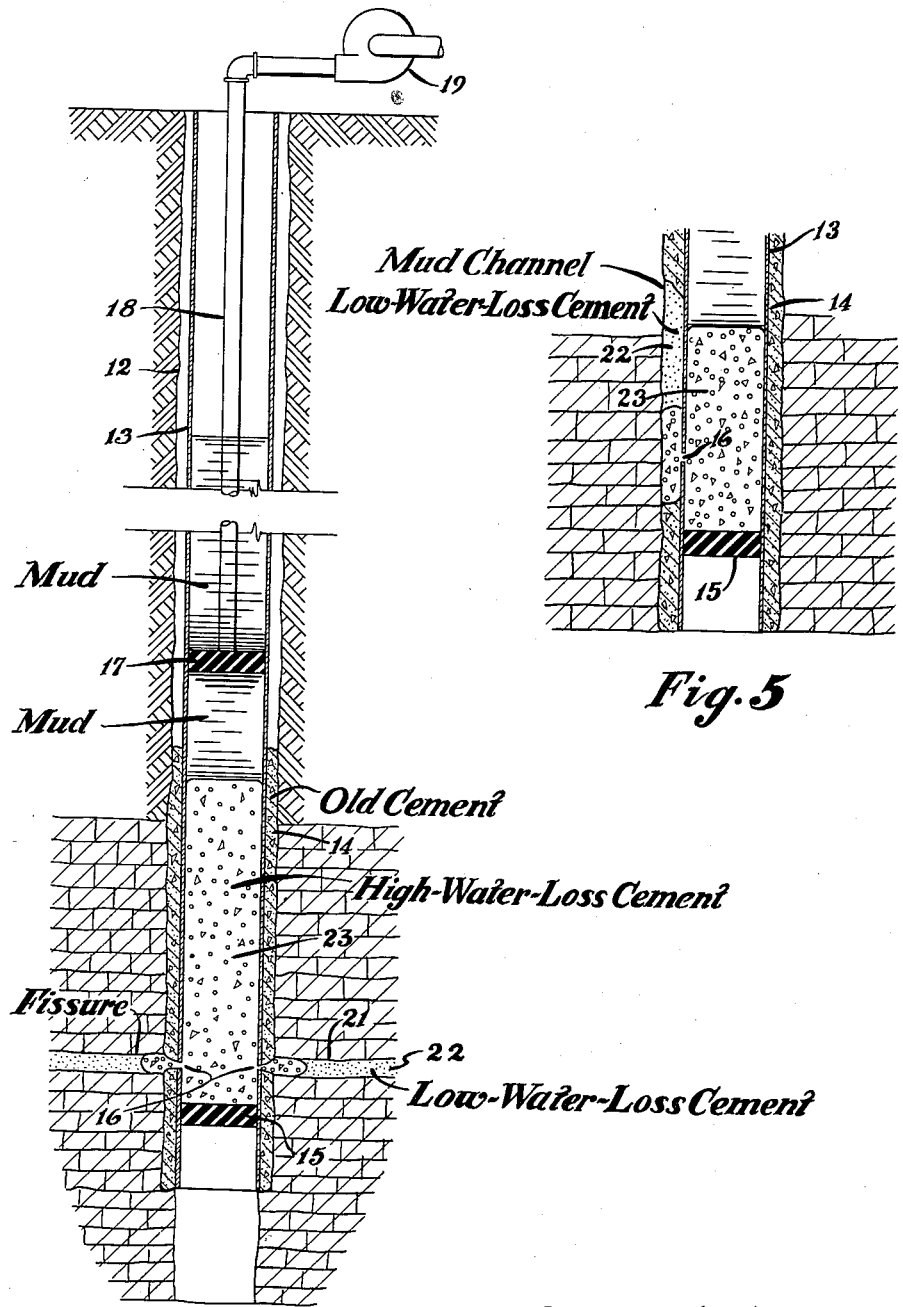

Patented Feb. 12, 1952

2,585,378

UNITED STATES PATENT OFFICE 2,585,378

CEMENTING OF WELLS

Riley F. Farris, Tulsa, Okla., assignor to Stanolind Oil and Gas Company, Tulsa, Okla., a corporation of Delaware Application March 1, 1946, Serial No. 651,327

5 Claims. (Cl. 166—22)

This invention pertains to the art of cementing wells, and more particularly it relates to improvements in well-cementing operations and compositions.

In well-cementing operations it is desirable to be able to place an adequate amount of cement, and particularly in squeeze-cementing operations it is desirable to obtain a high or squeeze pressure after an adequate amount of cement is in place. Aside from "staging" (allowing intermittent quiescent periods during the placing of the cement so that it reaches an initial set or begins to stiffen due to chemical hydration), which is relatively uncertain, there is no way to limit the amount of ordinary well cement a formation or mud channel will take before obtaining a squeeze pressure. And, furthermore, there is no way to prevent development of a squeeze pressure where it is desirable to introduce a large amount of cement.

In one important application of squeeze cementing wherein vertical migration of fluids in the formations is blocked by squeezing cement into the rock fissure along a horizontal plane, I have found that in most formations with available cements it is generally impossible to obtain the horizontal penetration desired due to the water-loss characteristics of those cements combined with the large filter area per unit volume of cement slurry. Furthermore, it is impossible to obtain a satisfactory seal immediately adjacent the well since these cements, while they become physically dehydrated a substantial distance from the well, do not become physically dehydrated and stiffen immediately adjacent the well. As a consequence when the squeeze pressure is relieved, the undehydrated cement is displaced by the pressure of the overburden from the horizontal rock fissure back into the well. The undehydrated cement therefore sets in the casing, does not effect a horizontal blockade to vertical migration of fluids immediately adjacent the well, and in some cases causes the tubing and cement retainer to become cemented in the well. In other formations, on the other hand, the permeability is so low that available cements are not suitable for squeeze cementing due to the fact that the water loss is too low; i. e., these cements dehydrate so slowly in low-permeability formations that it is practically impossible to obtain a squeeze pressure. Examples of this type formation are found in the Elk Basin Field, Wyoming.

In another application of squeeze cementing wherein cement is squeezed into a well between the casing and well wall, a similar difficulty is encountered. That is, there is no efficient way to control the setting time or amount of cement to insure a sufficient water shut-off.

In this application it is frequently found, for example, that after a casing-cementing job, water finds its way through mud channels in the cement from a water sand to the bottom of the casing and so into the well. When this occurs, the casing may be perforated at a point above the shoe and cement may then be pumped through the perforations to plug the channels through which the water is leaking into the well. Sometimes this operation results in a water shut-off and sometimes it does not. Failure to shut off water in these squeeze-cementing operations has been attributed to two principal causes. First, a cement bridge may develop in the channels which cannot be removed with the pump pressures available. This results in considerable cement slurry being left in the tubing and retainer and the possibility that the tubing and retainer will be cemented in the hole. Second, squeeze pressures may not have developed by the time the last of the cement leaves the casing perforations. It has been found that when squeeze pressures do not develop, the mud channels which are the channels left by the cement in the annulus between the casing and well wall are not completely sealed.

It is therefore an object of this invention to provide an improved hydraulic cement. Another object of this invention is to provide an improved process for blocking vertical migration of fluids in the formations adjacent a well. A more specific object of this invention is to provide a cement product which combined with an improved process will insure a horizontal barrier in the area adjacent a well whereby fluid migration outside the casing vertically will be eliminated. A further object of this invention is to provide a cement product and method for cementing oil and gas wells which will require less cement, insure that some cement enters all the channels behind a casing, and insure an adequate pressure build-up in squeeze-cementing operations performed for the purpose of blocking vertical migration of fluids in a formation or in a well behind the casing. Still another object of this invention is to provide a cement composition and method of application which will together insure against any possibility of cementing the tubing or cement retainer in a well. Other and more detailed objects of this invention will become apparent from the following description.

The invention in brief, therefore, may be described as a method of cementing oil and gas wells in which cements with improved water-loss characteristics are employed in an improved cementing process to insure the placing of a proper amount of cement and a final squeeze pressure, while avoiding any possibility of cementing the tubing or cement retainer in a well. The invention will be better understood by reference to the attached drawings in which:

Figure 2 is a diagrammatic representation of a cross section of a well showing schematically one embodiment of the invention together with one form of apparatus suitable for applying the invention in a well;

Figure 5 is a diagrammatic cross section of the lower end of a well showing the invention in an alternate application.

It is well known that a cement slurry in time becomes chemically hydrated, whereupon it stiffens and will resist flow. The property relied upon in the present invention is a different phenomenon depending less upon the time element and less upon chemical hydration of the slurry, but depending principally upon a physical dehydration. This property can best be illustrated by mixing a batch of cement slurry and pouring it into a container with a permeable outlet. As water is forced out of the slurry through this permeable outlet, the slurry will be found to become tightly packed and quite resistant to flow long before chemical hydration, as indicated by development of tensile strength, becomes appreciable. A similar action apparently occurs in cementing operations. That is, as the cement slurry flows along a channel bounded by permeable formations, it loses water in uncontrolled amounts to the formations, becoming stiff and resistant to flow. I propose a cement composition which permits control of the amount of water lost to such formations.

Figure 1:
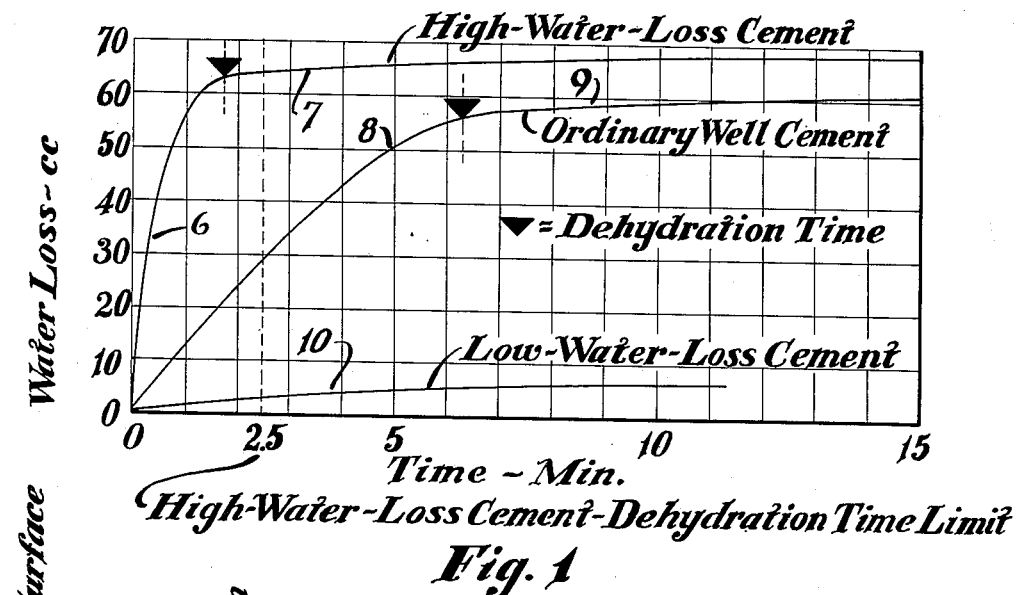
Figure 1 shows characteristic filtration curves from a herein standardized filtrate test for my improved cement and for ordinary well cements.

My improved cement, which will hereinafter be referred to as a "high-water-loss" cement, is defined as a settable hydraulic cement which has a dehydration time of two and one-half minutes or less in the filtration equipment described in A. P. I. Code No. 29, second edition, July, 1942 (tentative), where "dehydration time" is defined as the time required for the filtrate rate to decrease to 1 cc. per minute when the cylinder is filled to a depth of 4 inches with the cement slurry, a supernatant layer of relatively low-water-loss mud sufficient to fill the cylinder being added to prevent channeling of air through the cement slurry and to simulate the conditions actually encountered in well cementing, and a pressure of 5 p. s. i. gage being applied rapidly. While the above definition is controlling, the dehydration time is alternatively defined as the time at which the filtration-rate curve flexes from the cement filtrate rate to the mud-filtrate rate using the above-mentioned apparatus and procedure. This latter definition is more clearly exemplified in Figure 1, which shows a characteristic filtration curve for a high-water-loss cement as made with the above-described apparatus and procedure. The steep curve 6, showing a dehydration time of 1.75 minutes for the cement, is followed by a relatively flat curve 7, which is effectively the water-loss curve for the supernatant mud. A characteristic filtration curve for an ordinary well cement is also shown for comparison. This curve, like the high-water-loss cement curve, is composed of two parts: a relatively steep curve 8 representing the water-loss characteristics of the cement, and a relatively flat curve 9 representing the water-loss characteristics of the supernatant mud. A liquid-loss vs. time curve 10 for a low-liquid-loss fluid is also shown for comparison.

A low-liquid-loss fluid as used herein will refer to a settable fluid, including a hydraulic cement slurry as described in copending application S. N. 653,939, filed March 12, 1946, in the name of Joseph B. Clark, having a filter loss of less than 100 cc. using the instrument and procedure described in A. P. I. Code No. 29, second edition, July, 1942 (tentative). Typical cement slurries of this type are produced by incorporating in oil well cements between about 1 and about 4 per cent by weight of starchy materials such as pregelatinized starch and/or polyvinyl alcohol. The solids, including the cement and the starchy materials, are mixed with water to make a pumpable slurry. U. S. Patent 2,489,793, Ludwig discloses a number of examples of such cements. It will be noted that, whereas the high-water-loss and the ordinary well cements exhibit in general the same characteristics, the difference between the two types of cement is not a mere difference in degree, but the difference being so great and so important in cementing operations is a substantial change in kind. This difference is exemplified further in Table I, which shows the dehydration time as above defined for a number of the most common commercial well cements and a number of characteristic samples of high-water-loss cements.

Table I

| Cement | Water/Cement Ratio Gal./Sack | Dehydration Time— | |
|---|---|---|---|
| | | Min. | Sec. |
| A (slow set) | 4.75 | 3 | 45 |
| B (slow set) | 4.50 | 3 | 30 |
| C (slow set) | 5.10 | 3 | 30 |
| D (high early strength) | 6.25 | 9 | 30 |
| E (high early strength) | 6.00 | 4 | 30 |
| F (Portland) | 5.25 | 7 | 15 |
| High-water-loss (clinker through 140-mesh screen) | 4.75 | 2 | 15 |
| High-water-loss (clinker through 140-mesh screen +0.1% an alkylated aromatic sulphonate) | 4.75 | 1 | 45 |
| High-water-loss (clinker through 140-mesh screen +0.05% sugar) | 4.50 | 2 | 15 |

As can be seen from Table I high-water-loss cement can be made from coarsely ground clinker. Also, as can be observed in Table I, the water-loss characteristics of a cement can be improved by certain additives. In general, I have found that filter aids and those materials which tend to decrease the interfacial tension between cement particles and water are desirable additives. Examples are an alkylated aromatic sulphonate, sugar, gallic acid, tannic acid, a sodium or amine salt of a higher secondary alkyl sulphonates, a sodium salt of a higher primary alkyl sulphonate, etc.

The particle-size distribution is also important.

I have found, for example, that a Portland cement which passes through 140-mesh screen and has a particle-size distribution as shown in Table II has very satisfactory high water-loss characteristics.

*Table II*

| | Percent |
|---|---|
| Retained on 200-mesh screen | 20.80 |
| Retained on 325-mesh screen | 44.60 |
| Passed through 325-mesh screen | 34.60 |

By comparison it has been found that commercial well cements have a substantially different order of particle sizes. Tables III, for example, shows characteristic particle sizes for commercial cements.

*Table III*

| | Percent |
|---|---|
| Slow set—passed through 200-mesh screen | 87.6 |
| High early strength—passed through 200-mesh screen | 99.9 |

Referring now to Figure 2, a well 12 may have a casing 13 therein which has been cemented in place as by ordinary well cement 14. It is not uncommon for such wells, especially when heavily produced, to develop a gas or water cone through which these more or less undesirable well fluids may be produced with the oil. Recementing and squeeze cementing have been used to some success in alleviating this difficulty, but neither is completely satisfactory. Low-pressure recementing merely fills the most permeable mud channels within the well without affecting vertical migration within the formation. Squeeze cementing with ordinary cements is likewise ineffective as above described. I therefore employ a process in which an impermeable divider is placed in the formations to prevent vertical migration of fluids therein. A bridging plug 15 is first placed in the well 12 and preferably in casing 13 below the elevation at which the impermeable divider is to be placed. Casing perforations 16 are then placed by well-known means at or near the elevation of the proposed divider. A cement retainer 17 is then run into the well on tubing 18 to an elevation substantially, usually from 10 to 100 or more feet, above perforations 16. Low-water-loss cement is then introduced under pressure into tubing 18 and casing 13 by pump 19. Mud or other fluid previously left in tubing 18 and casing 13 may be displaced around cement retainer 17, or a circulation joint may be used near the lower end of the tubing. Also this fluid may be displayed into the perforations 16 ahead of the low-water-loss cement to cause the formation fissure 21 to develop by compacting the contiguous formations or by lifting the overburden. If this fissure is not developed by the fluid, the low-water-loss cement 22 will develop the fissure and formation divider as pressure is applied by pump 19. As indicated above, by using low-water-loss cement any reasonable amount can be pumped into the formation fissure to establish the impermeable block or divider and prevent vertical migration of fluids in the formation adjacent the well. This invention is, however, not limited to the use of a low-water-loss cement in forming the blockade to vertical migration of fluids in the well formations. Any other fluid, for example, a plastic, which has proper liquid-loss characteristics and which forms an impermeable blockade in a horizontal fissure may be employed in most cases.

When the proper volume of low-water-loss cement has been pumped into the fissure 21 and the blockade has the proper area, a high-water-loss cement 23 as above defined may be introduced into tubing 18 through pump 19 so that it follows preferably directly behind the low-water-loss cement 22 into the formation fissure. Cementing plugs, mud, water, etc., are sometimes employed to keep the two fluids separated. The volume of this latter cement is carefully chosen to avoid the possibility of cementing tubing 18 and cement retainer 17 in the well. More particularly, since it is known that the high-water-loss cement will remove by erosion or otherwise the filter cake deposited on the walls of the fissure by the low-water-loss cement and will dehydrate rapidly, the volume of this high-water-loss cement introduced into the well is preferably substantially the volume of casing 13 between perforations 16 and cement retainer 17. Since practically any amount of low-water-loss cement can be pumped into the fissure 21 and since a very small amount of high-water-loss cement can be pumped into the fissure, by controlling the volume of the high-water-loss cement in this manner it is certain that sufficient cement will be available to obtain a squeeze pressure indicating immediately that the low-water-loss cement is blocked in the fissure 21 and that perforations 16 are sealed. Furthermore, by thus adjusting the volume of high-water-loss cement it is certain that when the squeeze pressure does develop no cement will be left in cement retainer 17 and tubing 18 preventing their removal from the well. Instead the cement is completely displaced by mud from the tubing into the casing 13 where that part which is not used in obtaining the squeeze can readily be removed by drilling.

Figure 3:
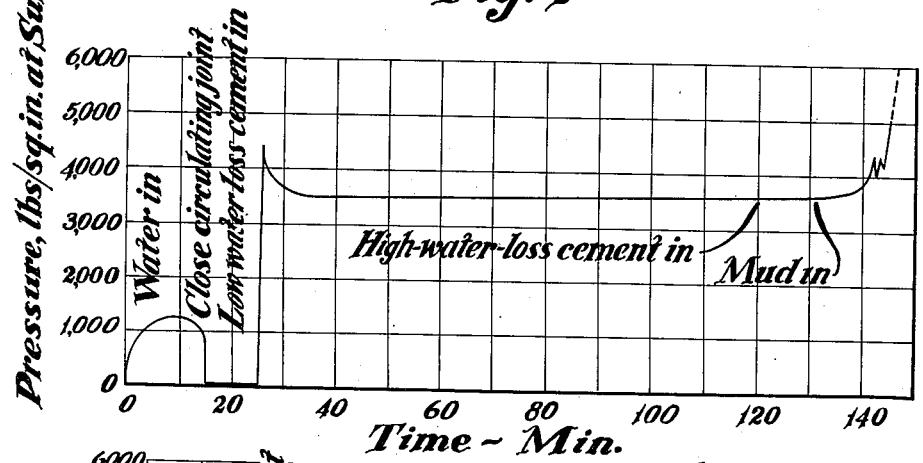
Figure 3 shows a characteristic pressure-time curve for squeeze-cementing operations employing the improved cements and cementing processes herein disclosed.

A characteristic pressure-time curve for the above-described process is shown in Figure 3. Water is first introduced at time 0 minutes to remove the mud from tubing 18 and displace it into the annulus between tubing 18 and casing 13. When the mud is removed from the tubing as indicated by the pressure change or by the volume of water introduced, circulation is stopped to permit closing of the circulation joint or seating of cement retainer 17. At time 25 minutes introduction of low-water-loss cement into the tubing is started and a squeeze pressure of 4500 pounds develops immediately. This pressure declines asymptotically to the pressure required to support the overburden or extend the fissure and continues at this pressure plus friction until the high-water-loss cement which is introduced at time 120 minutes reaches the fissure and commences to dehydrate, the high-water-loss cement building up a squeeze pressure and complete shut-off immediately.

Figure 4:
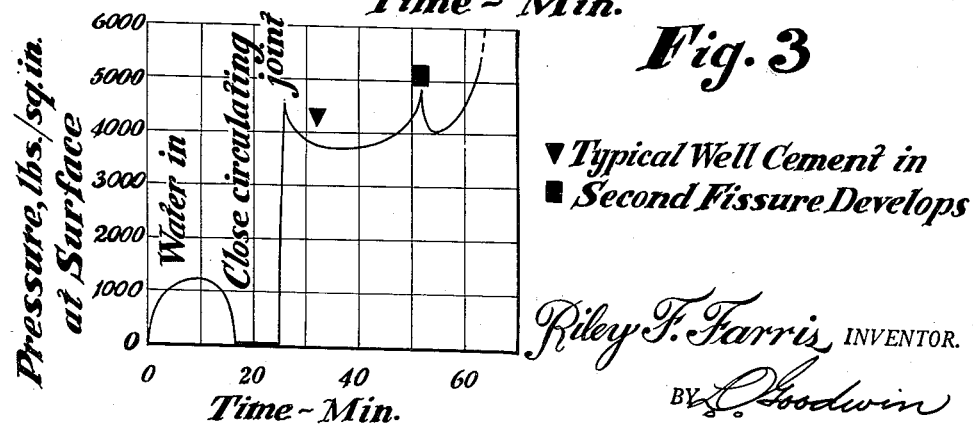
Figure 4 shows a characteristic pressure-time curve for squeeze-cementing operations employing a typical well cement and cementing process.

By comparison, a typical pressure-time curve for ordinary well cements is shown in Figure 4. Here mud and water are employed to rupture the formation. After the fissure is developed, the typical well cement is introduced (at time 31 minutes). Due to the water-loss characteristics of this cement, very little cement is squeezed into the fissure before the cement dehydrates and bridges, causing a pressure rise and the development of a second fissure starting at time 51 minutes. A second pressure rise and complete shut-off is then effected by placing only a small amount of ordinary cement. Obviously the area of the blockade is substantially less than that possible with the process of this invention as previously described.

Where the formations are relatively impermeable and a barrier is placed therein to prevent vertical migration of fluids in the formations, a modified process is employed. In this application it is generally necessary to initiate the fissure by the use of a low-liquid-loss fluid, and drilling mud is preferred. However, a low-water-loss cement may be employed to advantage in some cases. The high-water-loss cement is then pumped into the well and the fissure. Due to its water-loss characteristics it will dehydrate even in formations having a permeability of 5 millidarcys or less. Thus, a squeeze pressure develops even in this type of formation where ordinary cements do not and the high-water-loss cement will chemically hydrate in situ irrespective of a pressure drop in the well.

As indicated above, gas and/or water leaks into a well from behind the casing many times develop due generally to the mud channels which are left in the annulus by the cement. Prior to this invention operators have in general been unsuccessful in plugging these mud channels and blocking this flow of gas and/or water into the well from behind the casing. By reference to Figure 5 the application of this invention to this problem will be explained. As described in connection with the embodiment of this invention shown in Figure 2, a bridging plug 15 is first placed in the casing 13, preferably but not necessarily near the lower end thereof. A number of perforations 16 are then made in the casing immediately above the bridging plug. The sealing of these mud channels is accomplished with the same materials and apparatus and with a process substantially identical to the above-described process for producing a blockade in the formations. That is, a low-water-loss cement 22 is preferably introduced into the well first in an amount sufficient to penetrate the mud channel for a substantial distance, for example, 10 to 100 sacks or more. Since this cement dehydrates very slowly, it can be pumped into the channels at low pressure for great distances without danger of bridging due to dehydration of the slurry. Furthermore, as the amount of cement in a channel increases, the friction and back pressure increases, causing the slurry to seek other and less permeable mud channels. Such conditions are very favorable to a complete sealing of all the mud channels in the region of perforations 16. A high-water loss cement is then introduced into the well, preferably immediately after and following the low-water-loss cement. The amount of high-water-loss cement is carefully chosen as above-described so as to be sufficient to develop a squeeze pressure but not enough to extend into the tubing or cement retainer at the time the squeeze pressure develops. Thus, it can be seen that while the results are in terms different, the process as employed in sealing mud channels behind casing is substantially identical to the process as employed in forming a vertical blockade to fluid migration in the formations. And, furthermore, the same advantages as shown by the pressure-time curves of Figures 3 and 4 accrue in both instances, insuring an absolute and permanent seal against migration of fluids outside of casing 13 as well as avoiding all possibility of "junking" the hole by cementing the tubing therein. It will be apparent also that in some instances, particularly in very low permeability areas, the high-water-loss cement can be used alone to seal the mud channels behind a well casing.

This invention has thus been described by reference to specific embodiments, but it will be apparent that the invention is not so limited. For example, the high-water-loss cement herein described has particular advantage in stopping lost circulation in drilling wells due to its tendency to bridge more readily than ordinary well cements. Still another application of high-water-loss cement slurries is in plugback operations. Here the slurry, which is preferably squeezed in place, shrinks and the cement particles are compacted as the slurry dehydrates physically. Then when it sets by chemical hydration there is a slight expansion which insures a good seal to the well walls. Therefore, this invention is to be limited not by the specific examples but by the scope of the appended claims.

I claim:

1. A well cementing method comprising introducing into a well a first hydraulic cement slurry containing a starchy material, following said first hydraulic cement slurry with a second slurry of coarsely ground hydraulic cement clinker, said second slurry being introduced into said well under pressure, whereby said second slurry will be physically dehydrated when it contacts a permeable formation in said well, and a squeeze pressure is obtained.

2. A well cementing method comprising introducing into a well a first hydraulic cement slurry containing a starchy material and having a filtrate rate of less than about 100 cc. per 30 minutes using the instrument and procedure described in API Code No. 29, second edition, July 1942 (tentative), and following said first hydraulic cement slurry with a second slurry of coarsely ground hydraulic cement clinker having a dehydration time of 2½ minutes or less using said instrument and procedure, said second slurry being physically dehydrated when it contacts a permeable formation in said well, to obtain a squeeze pressure.

3. A well cementing method comprising introducing into a well a first hydraulic cement slurry having a filtrate rate of less than about 100 cc. per 30 minutes using the instrument and procedure described in API Code No. 29, second edition, July 1942 (tentative), and following said first hydraulic cement slurry with a second hydraulic cement slurry having a dehydration time of 2½ minutes or less using said instrument and procedure, said second hydraulic cement slurry being introduced into said well under pressure, whereby said second hydraulic cement slurry will be physically dehydrated when it contacts a permeable formation in said well to obtain a squeeze pressure and will prevent flow of said first hydraulic cement slurry back into said well when said pressure is removed.

4. A method of plugging the mud channels behind the casing in a well comprising the steps of introducing a quantity of a first hydraulic cement slurry behind said casing, said slurry having sufficient starchy material therein to produce a filtrate rate of less than about 100 cc. per 30 minutes using the instrument and procedure described in API Code No. 29, second edition, July 1942 (tentative), and following said first hydraulic cement slurry with a relatively small quantity of a second hydraulic cement slurry having an average particle size sufficient to produce a dehydration time of about 2½ minutes or less using said instrument and procedure, said second hydraulic cement slurry being introduced into said well under pressure, whereby said second hydraulic cement slurry will be physically dehydrated when it contacts a permeable formation in said well to obtain a squeeze pressure and will prevent flow of said first hydraulic cement slurry back into said well when said pressure is removed.

5. A method of preventing vertical migration of fluids in an area adjacent a well comprising introducing into said well a first hydraulic cement slurry having a filtrate rate of less than about 100 cc. per 30 minutes using the instrument and procedure described in API Code No. 29, second edition, July 1942 (tentative), said first hydraulic cement slurry being introduced into said well under a pressure great enough to produce a horizontal fissure in the formations penetrated by said well, displacing said first hydraulic cement slurry from said well with a second hydraulic cement slurry having a dehydration time of 2½ minutes or less using said instrument and procedure, and displacing said second hydraulic cement slurry down said well with another fluid under pressure, whereby said second hydraulic cement will be physically dehydrated adjacent said formation in said horizontal fissure to produce a squeeze pressure and will prevent flow of said first hydraulic cement slurry back into said well when the pressure is reelased, and whereby said first hydraulic cement slurry will be retained in a quiescent state until hydration is complete.

RILEY F. FARRIS.

REFERENCES CITED

The following references are of record in the file of this patent:

UNITED STATES PATENTS

| Number | Name | Date |
|---|---|---|
| Re. 19,570 | Halliburton | May 14, 1935 |
| 1,758,156 | Huber | May 13, 1930 |
| 1,805,104 | Reed-Lewis | May 12, 1931 |
| 1,891,701 | Winkler | Dec. 20, 1932 |
| 2,075,882 | Brantly | Apr. 6, 1937 |
| 2,155,129 | Hall et al. | Apr. 18, 1939 |
| 2,188,767 | Cannon | Jan. 30, 1940 |
| 2,206,389 | Cannon | July 2, 1940 |
| 2,210,545 | Hamilton | Aug. 6, 1940 |
| 2,236,251 | Scripture | Mar. 25, 1941 |
| 2,236,987 | Bechtold | Apr. 1, 1941 |
| 2,248,028 | Prutton | July 1, 1941 |
| 2,457,277 | Schlumberger | Dec. 28, 1948 |
| 2,469,353 | Alcorn | May 10, 1949 |

FOREIGN PATENTS

| Number | Country | Date |
|---|---|---|
| 466,229 | Great Britain | 1937 |

OTHER REFERENCES

Petroleum Production Engineering, Oil Field Development by L. C. Uren, pages 368-376, published by McGraw-Hill Book Co., New York, N. Y.